April 1, 1952 A. HAZELTINE 2,590,969

PHASE MODULATOR

Filed Nov. 16, 1949

INVENTOR

Alan Hazeltine.

BY

F. E. Browder

ATTORNEY

Patented Apr. 1, 1952

2,590,969

UNITED STATES PATENT OFFICE 2,590,969

PHASE MODULATOR

Alan Hazeltine, Maplewood, N. J., assignor to Westinghouse Electric Corporation, East Pittsburgh, Pa., a corporation of Pennsylvania Application November 16, 1949, Serial No. 127,696

17 Claims. (Cl. 332—27)

This invention relates to systems in which voltages from stable oscillators are varied in phase by signal voltages, and relates more particularly to phase modulators for radio transmitters.

Phase variations may be produced by varying either reactance or resistance. Circuits which employ variations in reactance and are normally purely resistive have the disadvantage of being critical, since they will usually be rather sharply tuned and a small change in reactance adjustment will introduce a relatively large change in its phase relations and will lead to non-linear distortion of the modulation. The use of resistance variations overcomes this disadvantage, but requires a regenerative arrangement to make the circuit normally purely reactive; and this regeneration introduces a tendency for the phase modulator to oscillate, which tendency is aggravated when coupled tuned circuits are employed. Such coupled circuits are desirable for more completely rejecting carrier harmonics and are also useful in stepping down voltage and in providing a balanced output for a frequency multiplier.

This invention overcomes the tendency to oscillate a regenerative phase modulator having coupled tuned circuits for its output. Four means to this end are provided, which may be used separately or preferably in conjunction: (1) the coupled circuits have resonant frequencies substantially different from the operating frequency and on the same side of the operation frequency; (2) the principal regenerative circuit elements, capacitance and self-inductance, are so arranged that the negative conductance introduced is greater at the operating frequency than at any frequency at which the phase modulator as a whole is resonant; (3) the regenerative circuit elements have a resonance near and on one side of the operating frequency such that regeneration is increased as resonance is approached; and (4) the regenerative circuit elements have a second resonance near and on the other side of the operating frequency such that regeneration is decreased as resonance is approached.

An object of the invention is to provide a phase modulator which is not critical in adjustment.

Another object of the invention is to prevent a regenerative electron tube circuit used as a phase modulator, from oscillating.

The invention will now be described with reference to the drawing, of which:

Figures 1, 2, 3, 4, 5, 6, 7:
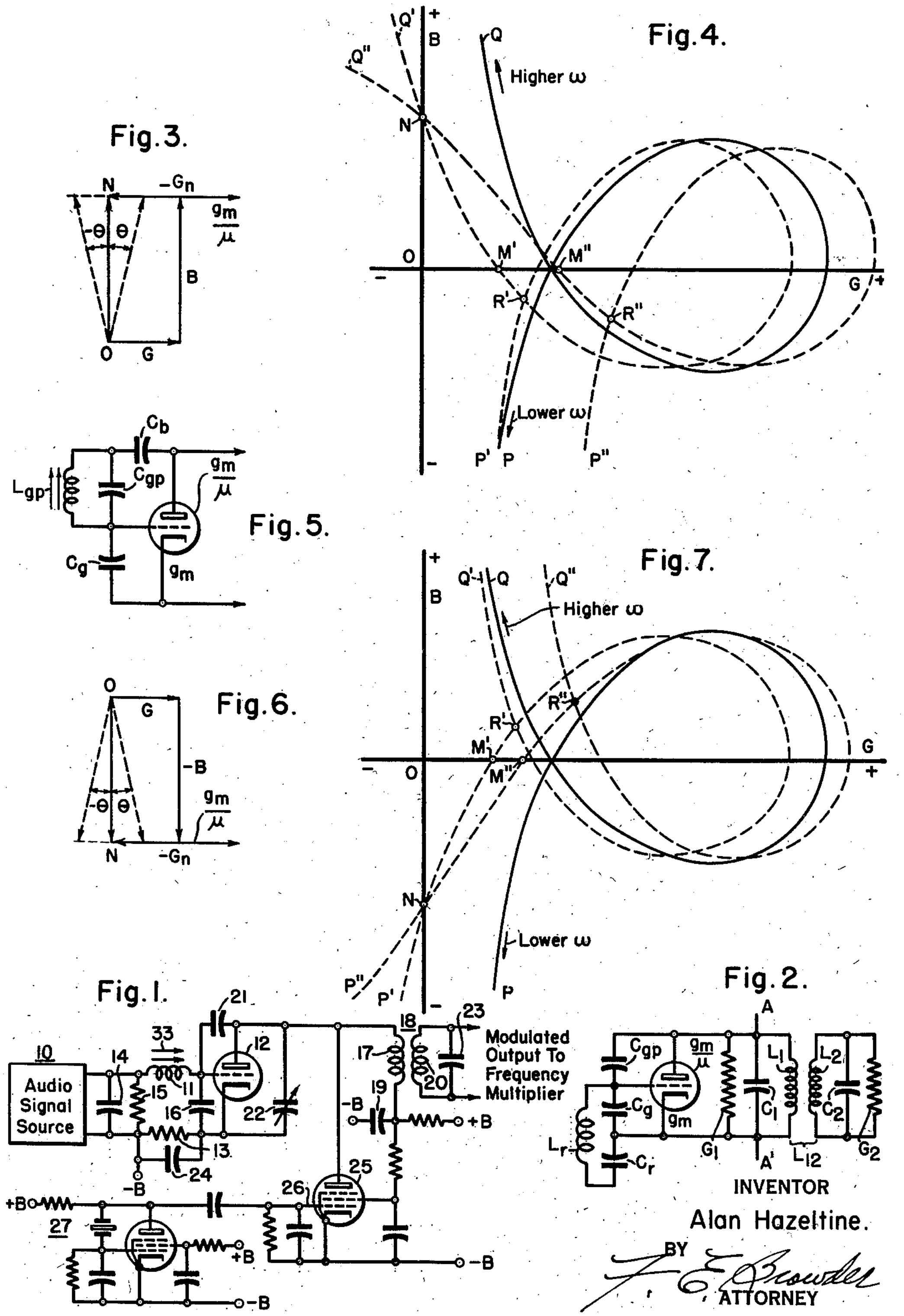
Fig. 1 is a simplified circuit schematic of one embodiment of the invention.
Fig. 2 is a simplified schematic of the circuit of the phase modulator tube of Fig. 1.
Fig. 3 is a vector diagram illustrating the operation of the modulator tube in Figs. 1 and 2.
Fig. 4 is a set of admittance loci corresponding to Figs. 2 and 3.
Fig. 5 is a simplified schematic of a modification of the invention.
Fig. 6 is a vector diagram illustrating the operation of the modulator tube in Fig. 5.
Fig. 7 is a set of admittance loci corresponding to Figs. 5 and 6.

Referring now to Fig. 1 of the drawing, the audio modulating signals are supplied through the variable inductor 11 to the control grid of the modulator tube 12, and through the bypassed bias resistor 13 to the cathode of the tube 12, from the audio signal source 10. The resistor 13 is connected to the negative terminal of a conventional plate-voltage supply source which is not illustrated. The capacitor 16 is connected between the grid and cathode of the tube 12. The capacitor 14 and the grid-leak resistor 15 are connected across the audio input to complete the path through inductor 11 for carrier-frequency and direct current respectively.

The plate of the modulator tube 12 is connected to one side of the primary winding 17 of the coupling transformer 18, the other side of which is connected to a positive terminal of the plate-voltage supply source, and through the by-pass capacitor 19 to the negative terminal of the plate-voltage supply source. The secondary winding 20 of the transformer 18 supplies the modulated output to the load circuit of the modulator which may be a conventional frequency multiplier. A variable capacitor 22 is connected between the plate and the cathode of tube 12; and a fixed capacitor 23 is connected across the secondary winding 20.

The plate of the modulator tube 12 is also connected through the feedback capacitor 21 to the control grid of the tube; but the grid-plate capacitance of the tube may suffice for feedback and capacitor 21 may then be omitted.

It has been found that certain vacuum tubes (particularly the 6J6) give a substantially linear variation of transconductance with modulating voltage over a wide range when the cathode bias resistor 13 is in the order of 500 to 1000 ohms and is not by-passed for modulation-frequency current. The capacitor 24 is therefore of only sufficient capacitance to by-pass carrier-frequency current.

The plate of the modulator tube is also connected to the plate of the buffer tube 25, whose control grid 26 receives carrier voltage from the conventional crystal oscillator 27.

In operation, regenerative feedback from the plate to the cathode of the modulator tube 12 occurs through the capacitor 21 in association with inductor 11 and capacitors 14 and 16. The modulator tube thus provides negative conductance which is varied in accordance with variations in the signals from the audio signal source 10, and which acts to vary the phase angle of the admittance across the output circuit between plate terminal A and ground A′. This results in phase modulation by the signals from the source 10, of the constant-frequency current from the buffer tube 25.

The operation of the modulator tube 12 in providing variable conductance between the points A and A′ on Fig. 1 of the drawing, can be explained by reference to Figs. 2–4 of the drawing with which the symbols defined in the following, are used:

$B$=the total susceptance of the circuit between A and A′, Fig. 2 without or with the modification of Fig. 5.

$C_{gp}$=the capacitance between the grid and the plate of the vacuum tube in Fig. 2 or Fig. 5.

$C_g$=the capacitance between the grid and the cathode.

$C_r$=the capacitance in series with the inductor $L_r$, Fig. 2.

$C_1$=the capacitance across the primary winding $L_1$, Fig. 2.

$C_2$=the capacitance across the secondary winding $L_2$.

$G$=the total conductance of the circuit between A and A′, Fig. 2 without or with the modification of Fig. 5.

$G_n$=the negative conductance due to regeneration, which is modulated.

$G_1$=the equivalent conductance of the primary circuit, including all sources of dissipation.

$G_2$=the equivalent conductance of the secondary circuit.

$g_m$=the transconductance of the vacuum tube.

$k=L_{12}/(L_1L_2)^{1/2}$=the coefficient of coupling between windings $L_1$ and $L_2$.

$L_{gp}$=the self-inductance of the regenerative inductor Fig. 5.

$L_r$=the self-inductance of the regenerative inductor Fig. 2.

$L_1$=the self-inductance of the primary winding.

$L_1'=L_1\ (1-k^2)$=the equivalent primary self-inductance when the secondary is short-circuited.

$L_2$=the self-inductance of the secondary winding.

$L_2'=L_2\ (1-k_2)$=the equivalent secondary self-inductance when the primary is short-circuited.

$L_{12}$=the mutual inductance between primary and secondary.

$\mu$=the amplification factor of the vacuum tube.

$\omega$=the angular frequency of the carrier or of any other alternating voltage that may be impressed between A and A′, Fig. 2 without or with the modification of Fig. 5.

If the tube in Fig. 2 is made inoperative, the total complex admittance between points A and A′ is $$G_1+j\omega(C_1+C_{gp})+\frac{1}{j\omega L_1'}\left[1+\frac{k^2}{\omega^2C_2L_2'-1-j\omega G_2L_2'}\right]=$$
$$\left\{G_1+\frac{k^2G_2L_2}{L_1}\cdot\frac{1}{(\omega^2C_2L_2'-1)^2+(\omega G_2L_2')^2}\right\}+$$
$$j\left\{\omega(C_1+C_{gp})-\frac{1}{\omega L_1'}-\frac{k^2}{\omega L_1'}\cdot\frac{\omega^2C_2L_2'-1}{(\omega^2C_2L_2'-1)^2+(\omega G_2L_2')^2}\right\} \tag{1}$$

Here we have neglected the resistive components associated with the regenerative elements $C_{gp}$, $C_g$, $C_r$, $L_r$; and we have also neglected the impedance of the combination $C_g$, $C_r$, $L_r$ in comparison with that of $C_{gp}$. Both of these approximations are ordinarily very close and they simplify the form of Equation 1. The first brace of (1) represents the total conductance G of the circuit and the second brace represents the total susceptance B: these are represented by the vectors G and B on Fig. 3.

When the tube in Fig. 2 is made operative, it introduces between the points A and A′ the plate conductance $g_m/\mu$ (which would be negligible if a pentode were used in place of the triode shown) and a negative conductance $G_n$ due to regeneration. The net added conductance is given by the equation $$\frac{g_m}{\mu}+G_n=g_m\left\{\frac{1}{\mu}-\frac{C_{gp}}{C_{gp}+C_g}\cdot\frac{\omega^2-1/C_rL_r}{\left(\frac{1}{C_{gp}+C_g}+\frac{1}{C_r}\right)\frac{1}{L_r}-\omega^2}\right\} \tag{2}$$

The inductance $L_r$ is normally so adjusted that this net negative conductance just balances the positive conductance G, as indicated by the upper horizontal vectors in Fig. 3 and as given by the equation $$O=G+\frac{g_m}{\mu}+G_n \tag{3}$$

The resulting admittance, represented by the vector ON, thus is normally purely reactive, that is, it is a pure susceptance equal to B.

When a modulating signal is impressed on the control grid, it causes $g_m$ in (2) to vary linearly with its voltage; so that the admittance vector ON swings through some angle $\pm\theta$ in Fig. 2, which may be made about 0.15 radian at maximum modulation. This angle is small enough so that tan $\theta$ is very nearly equal to $\theta$, which thus varies nearly linearly with the modulating voltage. With a fixed carrier current supplied at the points A, A′, the voltage between these points is thus modulated in phase; and this phase modulation is repeated in the voltage across the secondary coil $L_2$.

To study the oscillating tendency of the circuit of Fig. 2, the conductance G and the susceptance B may be calculated for various values of $\omega$ in Equation 1; and the results may be plotted as an admittance locus. An example is the solid curve PQ, Fig. 4, which corresponds to overcoupled circuits and to equal resonant frequencies in the two circuits:

$$(C_1+C_{gp})L_1'=C_2L_2' \tag{4}$$

(Under-coupled circuits would give no loop; they are usually less desirable.)

Suppose first that the regenerative circuit elements have such a large $C_r$ that $1/C_rL_r$ in (2) may be neglected in comparison with $\omega^2$ and also have such a low value of $(C_{gp}+C_g)L_r$ that $\omega^2$ in the denominator may be neglected in comparison with $1/(C_{gp}+C_g)L_r$. Then the regenerative negative conductance becomes approximately $$G_n=-g_m\omega^2C_{gp}L_r \tag{5}$$

If this negative value and the constant positive plate conductance $g_m/\mu$ are combined with the locus PQ, by shifting its points horizontally, the dash-line locus P′Q′ is obtained, the point N on the B-axis corresponding to N, Fig. 3. The point M′ where this locus crosses the G-axis is so far on the positive side of the origin O that the total conductance OM′ will remain positive even when $g_m$ is increased during modulation. This means that oscillation of the modulator will not occur, because the conditions for oscillation are that both the susceptance and the conductance shall be zero for some point of the locus. This result has been attained in this case by operating on the upper branch of the locus, so that the operating frequency is higher than the resonant frequencies of the primary and secondary circuits, and by the use of such regenerative means that the grid-plate impedance is predominantly capacitive and the grid-cathode impedance is predominantly inductive, so that the negative conductance $G_n$ in Equation 5 increases rapidly with frequency. The latter effect has been accentuated by the plate conductance $g_m/\mu$ of the triode, because it causes the net negative conductance $G_n+g_m/\mu$ to vary more rapidly with the frequency than would happen with a pentode, in which $g_m/\mu$ would be negligible.

Now return to the general expression (2) and suppose that the regenerative circuit elements as a whole are resonant at a frequency near and above the operating frequency. Then the expression $$\left(\frac{1}{C_{gp}+C_g}+\frac{1}{C_r}\right)\frac{1}{L_r}$$

in the denominator does not greatly exceed $\omega^2$; so the denominator varies rapidly with frequency. Suppose also that the two series elements $C_r$ and $L_r$ are resonant at a frequency near and below the operating frequency; so the numerator also varies rapidly with frequency. Each of these approaches to resonance causes $G_n$ to vary with frequency in the same sense as in Equation 5, but much more rapidly. The corresponding admittance locus then has a form such as P″Q″, Fig. 4; and the point M″ where it crosses the G-axis represents an even larger positive conductance than does point M′. There is thus a larger margin of safety against oscillation in the phase modulator.

A still larger margin of safety is secured if $C_1$ is increased slightly; for this has the effect of raising the loci of Fig. 4, especially at higher frequencies. If they are raised so that the cross-over points R′ and R″ fall on the G-axis, they will evidently represent larger positive conductances than do the points M′ and M″ respectively. Thus, in place of equal resonant frequencies, as in Equation 4, it is preferable to have the primary circuit resonant at a slightly lower frequency than the secondary circuit.

The circuit of Figs. 1 and 2 is arranged to have a net capacitive susceptance between A and A′, as represented by ON in Figs. 3 and 4. If a net inductive susceptance is desired, as represented by ON, Fig. 6, the regenerative means should include a grid-plate impedance which is predominantly inductive and a grid-cathode impedance which is predominantly capacitive, as in Fig. 5. The remainder of the circuit may be the same as in Fig. 2 and so has an admittance locus PQ, Fig. 7 essentially the same as PQ, Fig. 4, the low admittance through $L_{gp}$ not being important here. The capacitor $C_b$, Fig. 5 is for blocking direct and modulating currents and may be large enough to have negligible effect at the carrier frequency. The net negative conductance due to the operation of the triode, in place of Equation 2, is now given by the equation $$\frac{g_m}{\mu}+G_n=g_m\left\{\frac{1}{\mu}-\frac{1-\omega^2 C_{gp}L_{gp}}{\omega^2(C_g+C_{gp})L_{gp}-1}\right\} \qquad (6)$$

Suppose first that the regenerative elements have such a small $C_{gp}$ that $\omega^2 C_{gp}L_{gp}$ may be neglected in comparison with unity and also have such a large $C_g$ that $\omega^2 C_g L_{gp}$ is very large compared with unity. Then the regenerative negative conductance becomes approximately $$G_n=\frac{-g_m}{\omega^2 C_g L_{gp}} \qquad (7)$$

If this negative conductance and the constant positive plate conductance $g_m/\mu$ are combined as before with the locus PQ, Fig. 7, the dash-line locus P′Q′ is obtained, the point N on the B-axis corresponding to N, Fig. 6. The point M′ where this locus crosses the G-axis is again so far on the positive side of the origin O that the total conductance OM′ will remain positive even when $g_m$ is increased during modulation; so that oscillation of the modulator will not occur. This result has been attained in this case by operating on the lower branch of the locus, so that the operating frequency is lower than the resonant frequencies of the primary and secondary circuits, and by the use of such regenerative means that the grid-plate impedance is predominantly inductive and the grid-cathode impedance is predominantly capacitive, so that the negative conductance $G_n$ in Equation 7 decreases rapidly with increasing frequency. As before, the latter effect has been accentuated by the plate conductance of the triode.

Now return to the general expression (6) and suppose that the regenerative circuit elements as a whole are resonant at a frequency near and below the operating frequency. Then the expression $\omega^2(C_g+C_{gp})L_{gp}$ in the denominator does not greatly exceed unity; so the denominator varies rapidly with frequency. Suppose also that the two parallel elements $C_{gp}$ and $L_{gp}$ are resonant at a frequency near and above the operating frequency; so the numerator also varies rapidly with frequency. Each of these approaches to resonances causes $G_n$ to vary with frequency in the same sense as in Equation 7, but much more rapidly. The corresponding admittance locus then has a form such as P″Q″, Fig. 7; and the point M″ where it crosses the G-axis represents an even larger positive conductance than does the point M′, with a correspondingly larger margin of safety against oscillation in the phase modulator.

A still larger margin of safety is secured if the primary capacitance $C_1$ is decreased slightly; for this has the effect of lowering the loci of Fig. 7, especially at higher frequencies, bringing the cross-over points R′ and R″ near the G-axis. Thus, in place of equal resonant frequencies, it is preferable to have the primary circuit resonant at a slightly higher frequency than the secondary circuit.

In the operation of any form of this invention, two adjustable controls are used: (1) a regenerative control which provides just enough negative conductance $G_n$ to make the circuit between A and A′ purely reactive, so that the vector ON, Fig. 3 or Fig. 6 is a pure susceptance, $\pm B$, thus making the positive and negative phase shifts equal and minimizing non-linear distortion; and (2) a modulation control which determines the normal value of this susceptance and thus the modulation index $\theta$, Fig. 3 or Fig. 6, for a given modulating signal voltage. Neither of these adjustments is highly critical. The former may be made by a movable iron core 33, Fig. 1, which varies the self-inductance $L_r$, Fig. 2, and by a similar iron core which varies $L_{gp}$, Fig. 5. The latter may be made by the adjustable capacitor 22 in Fig. 1, either as this figure stands or when it is modified by incorporating the alternative regenerative arrangement of Fig. 5. (It may happen that the vector which is modulated, represented by $-G_n$ in Figs. 3 and 6, is slightly tilted, due to departures from the ideal circuit relations described; in such case, the regenerative control is still adjusted to minimize non-linear distortion, principally by the second haromonic, and this adjustment will always make the resultant admittance vector ON perpendicular to the modulated vector.)

Among the advantages of this variable-conductance modulator is that it is stable; it is substantially free from non-linear distortion; and it does not require highly critical adjustment.

I claim as my invention:

1. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially lower than the frequency of said oscillations, and regenerative means including a predominantly capacitive impedance between said anode and said grid and a predominantly inductive impedance between said grid and said cathode.

2. A phase modulator as claimed in claim 1 in which said circuits have parameters so proportioned that the primary output circuit has a resonant frequency lower than the resonant frequency of the secondary output circuit.

3. A phase modulator comprising an electron tube having a control grid, a cathode, and an anode, means for applying signal voltages to said grid and cathode, a source of carrier oscillations connected to said anode, an output circuit having net capacitive susceptance connected to said anode, and regenerative means including a predominantly capacitive impedance between said anode and said grid and a predominantly inductive impedance between said grid and said cathode, said regenerative means being resonant as a whole at a frequency near and above the frequency of said oscillations.

4. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially lower than the frequency of said oscillations, and regenerative means including a predominantly capacitive impedance between said anode and said grid and a predominantly inductive impedance between said grid and said cathode, said regenerative means being resonant as a whole at a frequency near and above the frequency of said oscillations.

5. A phase modulator comprising an electron tube having a control grid, a cathode, and an anode, means for applying signal voltages to said grid and cathode, a source of carrier oscillations connected to said anode, an output circuit having net capacitive susceptance connected to said anode, and regenerative means including a predominantly capacitive impedance between said anode and said grid and a predominantly inductive impedance between said grid and cathode, said inductive impedance including series self-inductance and capacitance resonant at a frequency near and below the frequency of said oscillations.

6. A phase modulator comprising an electron tube having a control grid, a cathode, and an anode, means for applying signal voltages to said grid and cathode, a source of carrier oscillations connected to said anode, an output circuit having net capacitive susceptance connected to said anode, and regenerative means including a predominantly capacitive impedance between said anode and said grid and a predominantly inductive impedance between said grid and said cathode, said regenerative means being resonant as a whole at a frequency near and above the frequency of said oscillations, and said inductive impedance including series self-inductance and capacitance resonant at a frequency near and below the frequency of said oscillations.

7. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially lower than the frequency of said oscillations, and regenerative means including a predominantly capacitive impedance between said anode and said grid and a predominantly inductive impedance between said grid and said cathode, said inductive impedance including series self-inductance and capacitance resonant at a frequency near and below the frequency of said oscillations.

8. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially lower than the frequency of said oscillations, and regenerative means including a predominantly capacitive impedance between said anode and said grid and a predominantly inductive impedance between said grid and said cathode, said regenerative means being resonant as a whole at a frequency near and above the frequency of said oscillations, and said inductive impedance including series self-inductance and capacitance resonant at a frequency near and below the frequency of said oscillations.

9. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially higher than the frequency of said oscillations, and regenerative means including a predominantly inductive impedance between said anode and said grid and a predominantly capacitive impedance between said grid and said cathode.

10. A phase modulator as claimed in claim 9 in which said circuits have parameters so proportioned that the primary output circuit has a resonant frequency higher than the resonant frequency of the secondary output circuit.

11. A phase modulator comprising an electron tube having a control grid, a cathode, and an anode, means for applying signal voltages to said grid and cathode, a source of carrier oscillations connected to said anode, an output circuit having net inductive susceptance connected to said anode, and regenerative means including a predominantly inductive impedance between said anode and said grid and a predominantly capacitive impedance between said grid and said cathode, said regenerative means being resonant as a whole at a frequency near and below the frequency of said oscillations.

12. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially higher than the frequency of said oscillations, and regenerative means including a predominantly inductive impedance between said anode and said grid and a predominantly capacitive impedance between said grid and said cathode, said regenerative means being resonant as a whole at a frequency near and below the frequency of said oscillations.

13. A phase modulator comprising an electron tube having a control grid, a cathode, and an anode, means for applying signal voltages to said grid and cathode, a source of carrier oscillations connected to said anode, an output circuit having net inductive susceptance connected to said anode, and regenerative means including a predominantly inductive impedance between said anode and said grid and a predominantly capacitive impedance between said grid and said cathode, said inductive impedance including parallel self-inductance and capacitance resonant at a frequency near and above the frequency of said oscillations.

14. A phase modulator comprising an electron tube having a control grid, a cathode, and an anode, means for applying signal voltages to said grid and cathode, a source of carrier oscillations connected to said anode, an output circuit having net inductive susceptance connected to said anode, and regenerative means including a predominantly inductive impedance between said anode and said grid and a predominantly capacitive impedance between said grid and said cathode, said regenerative means being resonant as a whole at a frequency near and below the frequency of said oscillations, and said inductive impedance including parallel self-inductance and capacitance resonant at a frequency near and above the frequency of said oscillations.

15. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially higher than the frequency of said oscillations, and regenerative means including a predominantly inductive impedance between said anode and said grid and a predominantly capacitive impedance between said grid and said cathode, said inductive impedance including parallel self-inductance and capacitance resonant at a frequency near and above the frequency of said oscillations.

16. A phase modulator comprising an electron tube having a control grid, a cathode, and an anode, means for applying signal voltages to said grid and cathode, a source of carrier oscillations connected to said anode, a primary output circuit connected to said anode, a secondary output circuit coupled to said primary circuit, said primary and secondary circuits having parameters so proportioned that each of said circuits has a resonant frequency substantially higher than the frequency of said oscillations, and regenerative means including a predominantly inductive impedance between said anode and said grid and a predominantly capacitive impedance between said grid and said cathode, said regenerative means being resonant as a whole at a frequency near and below the frequency of said oscillations, and said inductive impedance including parallel self-inductance and capacitance resonant at a frequency near and above the frequency of said oscillations.

17. A phase modulator comprising an electron tube having a control grid, a cathode, and an anode, means for applying signal voltages to said grid and cathode, a source of carrier oscillations connected to said anode, a primary output circuit connected to said anode, a secondary output circuits coupled to said primary circuit, said primary and secondary circuits having parameters so proportioned that each of said circuits has a resonant frequency substantially different from the frequency of said oscillations and on the same side of this frequency, and regenerative means including reactance of one sign between said anode and said grid and reactance of the other sign between said grid and said cathode, the signs of said reactance being such that negative conductance introduced by regeneration is greater at the frequency of said oscillations than at any frequency at which the phase modulator circuit as a whole is resonant.

ALAN HAZELTINE.

REFERENCES CITED

The following references are of record in the file of this patent:

UNITED STATES PATENTS

| Number | Name | Date |
|---|---|---|
| 2,087,428 | Crosby | July 20, 1937 |
| 2,278,429 | Crosby | Apr. 7, 1943 |
| 2,430,126 | Korman | Nov. 4, 1947 |